J. B. LINCOLN.
Sewing-Machine Casters.

No. 137,141. Patented March 25, 1873.

WITNESSES.
Charles W. Everett
Daniel H. Fink

INVENTOR.
Jesse B. Lincoln

UNITED STATES PATENT OFFICE.

JESSE B. LINCOLN, OF PROVIDENCE, RHODE ISLAND, ASSIGNOR TO HIMSELF AND JAMES M. SAYLES, OF SAME PLACE.

IMPROVEMENT IN SEWING-MACHINE CASTERS.

Specification forming part of Letters Patent No. 137,141, dated March 25, 1873.

*To all whom it may concern:*

Be it known that I, JESSE B. LINCOLN, of the city and county of Providence, in the State of Rhode Island, have invented a new and useful Improvement in Casters, of which the following is a specification:

In the accompanying drawing like letters indicate like parts.

Figure 1:
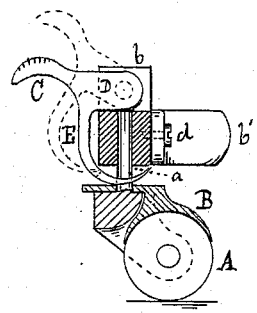
Figure 2:
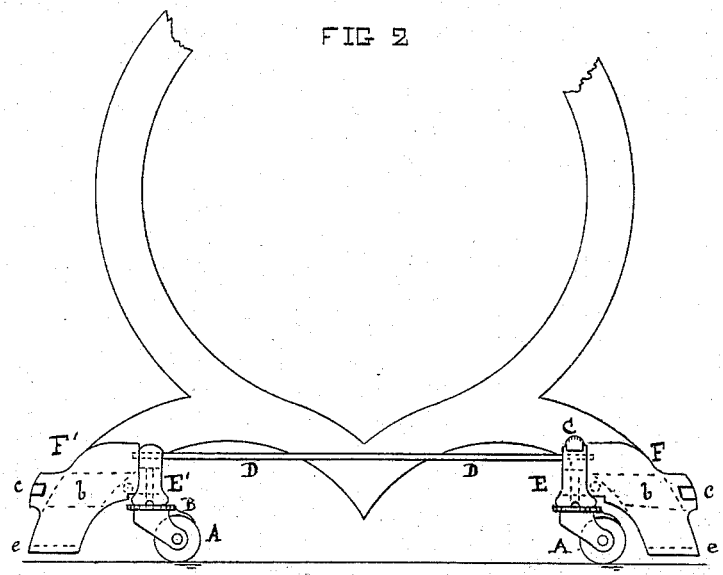
Figure 3:
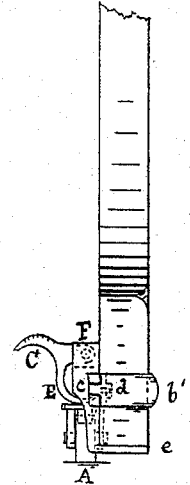

Figure 1 is a vertical section, showing the several parts of my invention. Fig. 2 is a side elevation, showing my invention and the mode of attaching it. Fig. 3 is a front elevation of the same.

My invention relates to casters upon which furniture or heavy articles are moved, and may be applied wherever a caster is used. It is, however, especially adapted for sewing-machines, as they require to be moved frequently, and are too heavy to be easily handled.

Casters are sometimes placed upon one side, and the machine, lifted by main strength upon the other, is tumbled about. This allows motion only in one direction, and is attended with much inconvenience and fatigue. Various other means, more or less valuable, have been used, which are too complicated or expensive to admit of general use.

I accomplish the result in a simple and effectual manner, which permits movement in every desired direction by placing casters upon each foot. But the power applied to the treadle is so great that a vibratory motion would be communicated therefrom in case ordinary casters were used, rendering the table unsteady and insecure. I therefore prevent this difficulty, and obtain the requisite firmness and steadiness by locking or fastening the casters in position so as to render their further motion impossible, and the machine then rests immovably upon them; and my invention consists in a peculiar form of brake, attached to the swivel of the caster, and having a slight vertical movement, which brake is forced down upon the wheel of the caster by a bent cam-lever, turning upon a rod, and having its lower arms in the shape of a wedge-hook to clasp around the spindle, as hereinafter more fully described.

The caster may be thus fastened in various ways; that shown in the accompanying drawing is simple, cheap, and practical.

The caster A is provided with a brake, B, secured to the swivel $a$ of the caster by a ring, and adjusted so as to admit of a slight vertical motion. The brake B is crowded against the wheel by means of a bent lever, C, turning upon the rod D, and made, on its lower arm, in the shape of a hook-like wedge, E. This wedge-hook enters between the brake B and the clamp F on each side of the swivel $a$, and prevents the revolution of the wheel on its axis, as well as the turning of the caster upon its swivel. The lever projects from the inner side of the leg, and is easily operated. Upon the other or hinder end of the rod D is placed another wedge, E', which acts similarly upon its corresponding brake, and which, as well as the lever C E, is immovably fastened to the rod D. The rod works in sockets in the clamps F F'.

This mechanism may be attached to the standard itself, or, as I prefer, to adjustable clamps F F'. Those shown in the drawing are made in two parts, $b$ $b'$, to clasp the leg, and are hinged at $c$ and fastened by a screw, $d$. The feet of the machine rest upon a flange, $e$, turned on the bottom of the clamp, and is thus raised from the floor. The swivel of the caster turns in an arm of the clamp, and its head rests against the lever C.

If only the two casters in front be thus fastened, the same result would be accomplished, and a part of this mechanism—the rod D and wedge E—might be dispensed with. Such a contrivance would obviously be within my invention, as would also the locking of the casters by bolts, ratchet, and pawl, or other mechanical device.

I claim as a novel and useful invention and desire to secure by Letters Patent—

The combination of the caster A, brake B, lever C, wedges E E', and rod D, with or without the adjustable hinged clamps F F', as and for the purpose specified.

JESSE B. LINCOLN.

Witnesses:
CHARLES W. EVERETT,
DANIEL W. FINK.